United States Patent Office 3,102,912
Patented Sept. 3, 1963

3,102,912
SURFACE ACTIVE PHENOXY, ETHOXYLATED HYDROXY PROPYLAMINES
Otto E. Neracher, Mount Vernon, and Murray W. Winicov, Flushing, N.Y., assignors to West Laboratories, Inc., Long Island, N.Y., a corporation of New York
No Drawing. Filed Mar. 4, 1960, Ser. No. 12,700
9 Claims. (Cl. 260—570.7)

This invention relates to new surface active compounds having useful properties as wetting agents, detergents, and the like. More particularly, the invention relates to a new class of surface active compounds which may be referred to as γ-alkylated phenoxy-β-ethoxylated hydroxy di-N-substituted propylamines and salts and quaternary ammonium derivatives thereof.

The new tertiary amines in accordance with the present invention may be represented by the following formula:

(I)
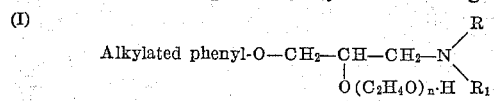

wherein the alkyl substituents in the alkylated phenyl group have a total of 6 to 18 carbon atoms, —NRR$_1$ is a secondary amino radical free of active hydrogen substituents and $n$ is an integer from 1 to 100. More particularly, the radical —NRR$_1$ may represent secondary amino radicals such as N,N-lower di-alkyl amino, N-lower alkyl N-aryl amino, N-lower alkyl N-aralkyl amino, N,N-diaralkylamino, piperidyl, morpholyl and pyrrolidyl radicals. The formulas for salts and quaternary ammonium derivatives of these tertiary amines need not be presented, as they can be readily visualized from the foregoing formula of the amines.

In these new compounds the alkylated phenyl and ethoxylated groupings of the amines provide respectively hydrophobic and hydrophilic characteristics, whereas the tertiary amine, amine salt, or quaternary ammonium moiety provide a special reactivity including, in the case of the quaternary ammonium moiety, a degree of substantivity to many fabrics and fibrous materials.

Preparation of the new compounds can be economically effected starting with an alkylated phenol, reacting the same with an epihalohydrin under alkaline conditions to form an alkylphenylglycidyl ether of the formula

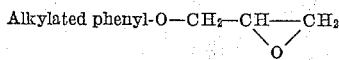

reacting this with a secondary amine at a temperature above about 50° C. to form a tertiary amine alcohol of the formula

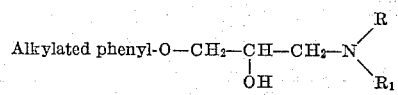

ethoxylating the secondary hydroxyl group in the presence of an alkaline catalyst to the extent desired in the tertiary amine product (I), and reacting the same with the appropriate acid or quaternizing agent to form the desired salt or quaternary ammonium derivative.

The starting alkylated phenol may be any alkylated phenol containing 1 to 4 alkyl substituents providing a total of 6 to 18 carbon atoms including, for example, tripropyl phenol and cresol, isomeric dibutyl and diamyl phenol and cresol, and secondary or tertiary isomeric heptyl, octyl, nonyl, decyl, undecyl, dodecyl, tetradecyl, cetyl and octadecyl phenol and cresol. The alkylated phenol is reacted with a molar excess of a suitable epihalohydrin such as epichlorohydrin or epibromohydrin by slowly adding to a warmed (75° to 95° C.) mixture thereof one mol of alkali such as sodium hydroxide in aqueous solution, while keeping the pH of the reaction mixture below about 10. The oily product, after separation from salts precipitated in the reaction, washing with water and slightly acidified water to remove excess alkali, and evaporation under reduced pressure to remove excess epihalohydrin, contains a mixture of alkylphenylglycidyl ether and β-hydroxy-3-(alkylphenyl)propyl halide as a by-product. Treatment of this mixture with aqueous alkali and working up as before, followed by distillation under reduced pressure effects conversion of the by-product to the desired alkylphenylglycidyl ether, which is directly recovered with a purity in excess of 90%.

The alkylphenylglycidyl ether is then reacted with a molar equivalent of a secondary amine by adding the amine slowly while maintaining a reaction temperature of about 75–80° C. or somewhat higher with certain amines. With a volatile amine the reaction can be carried out under pressure or, as in the case of dimethyl amine, by employing an aqueous solution of the amine and a slightly lower reaction temperature, i.e. about 45–50° C. In general, the secondary amine employed can be any di-substituted amine in which the substituents contain no active hydrogen. Typical amines which are suitable include N,N-lower alkyl amines such as N,N-dimethyl amine, N,N-diethyl amine, N-methyl-N-ethyl amine, N,N-dipropyl amine, N,N-diisopropyl amine, and N,N-dibutyl amine; N-lower alkyl anilines such as N-methyl aniline, N-ethyl aniline, N-propyl aniline, N-isopropyl aniline and N-butyl aniline; N-lower alkyl aralkyl amines such as N-methyl benzylamine, N-ethyl benzylamine, N-propyl benzylamine, N-isopropyl benzylamine and N-butyl benzylamine; N,N-dibenzylamine; and the heterocyclic amines piperidine, morpholine and pyrrolidine.

Another practical way of preparing the new tertiary amines in accordance with the present invention is to first react the secondary amine with the epihalohydrin to form the 1-di-substituted amino propylene-2,3-epoxide and then reacting the epoxide with the desired alkylated phenol to form the γ-alkylated phenoxy-β-hydroxy di-N-substituted propylamines. One advantage of this approach is that certain of the 1-di-substituted amino propylene-2,3-epoxide are commercially available intermediates.

The tertiary amine alcohol of the formula

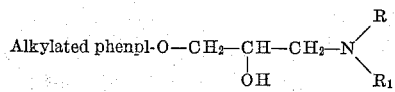

is then ethoxylated, suitably by heating and agitating a quantity thereof with about 0.5 to 1% by weight of sodium hydroxide at elevated temperature of about 160° C. or higher while introducing ethylene oxide into the agitated mixture. Such introduction of ethylene oxide converts the OH group in the above formula to —(CH$_2$CH$_2$O)$_n$·H and the reaction is continued until "$n$," determined by weight increase in the reaction product reaches a desired value. This value of $n$, or the number of mols of ethylene oxide in the product, may vary from number 1 to about 100 with the generally preferred range being about 10 to 30 mols of ethylene oxide. These products which are normally liquids when the ethylene oxide content is relatively low become more viscous or even solid, although readily water-soluble, as the ethylene oxide content is increased. Depending upon the molecular weight of the alkyl phenyl moiety reduction of the ethylene oxide content below about 6 mols may reduce the water solubility, but even the relatively insoluble products have useful surface active properties.

The ethoxylated tertiary amines are cationic in nature and readily form acid salts, while at the same time having moderate to good detergent properties. They are accordingly surface active agents having a general and varied utility, and are particularly useful as textile auxiliary products and dye bath additives. As iodophors or complexing agents for iodine, they effect a firm binding of the iodine, thus minimizing losses of iodine through vaporization, while gradually releasing iodine in aqueous solution to effect its germicidal action. Complexes of iodine with these amines and their salts and quaternary ammonium derivatives are disclosed and claimed in our co-pending application Serial No. 12,688 filed March 4, 1960.

The ethoxylated tertiary amines can readily be converted to corresponding quaternary ammonium compounds by reaction with a conventional quaternizing agent. The reaction, frequently exothermic in nature, can be carried out by stirring together equimolar amounts of the tertiary amine and quaternizing agent for an extended period of 3 to 4 hours at a temperature of about 50–60° C.

The resulting quaternary compounds possess all of the general advantages of the tertiary amines as surface active agents and iodophors. They are, however, inherently more stable than the amines, particularly in acidic or basic media, and exhibit marked substantivity for many fabrics and fibrous materials.

The following examples will show how the procedures above described are applied in the preparation of a number of ethoxylated tertiary amines and quaternary ammonium derivatives thereof in accordance with the present invention, but it is to be understood that these examples are given by way of illustration and not of limitation.

EXAMPLE 1

*Preparation of Alkylphenylglycidyl Ether*

To a mixture of one mole of commercial distilled alkylphenol and two moles of epichlorhydrin in a three-necked flask equipped with thermometer, stirrer and addition funnel, was added dropwise at 75–95° C. a solution of one mole sodium hydroxide in 80 mls. of water. The pH of the reaction was kept below ten; 4–5 hours were required to bring the reaction to completion. The oil layer was separated from the precipitated sodium chloride and thoroughly washed with several portions of water to remove all water soluble substances. Five mls. of acetic acid were added to the oil prior to the final wash to insure freedom from alkali. Excess epichlorhydrin was removed from the remaining organic mixture under reduced pressure. The resulting oil consisted mainly of a mixture of alkylphenylglycidyl ether and 2-hydroxy-3-(alkylphenoxy)-propyl chloride as a by-product. In order to convert the latter into the alkylphenylglycidyl ether, the mixture was treated with one additional mole of sodium hydroxide in 80 mls. of water. After the dropwise addition of the sodium hydroxide solution was completed, heating at 75–80° C. and stirring was continued for an additional three hours. The aqueous layer was withdrawn, the product washed several times with water to remove sodium chloride and excess alkali. As before, five mls. of acetic acid were added before the final wash. The remaining alkylphenylglycidyl ether was distilled under reduced pressure and gave a product of greater than 90% purity, as shown by conventional epoxide analysis. Pertinent data concerning three such alkylphenylglycidyl ethers is presented in the following table:

Table 1

ALKYLATED PHENYL GLYCIDYL ETHERS

| Carbon Atoms in Alkyl Group | Distn. Range at 0.5 mm. | Analysis, percent Epoxide |
| --- | --- | --- |
| 8 (octyl) | 120–130 | 98 |
| 9 (nonyl) | 130–140 | 95 |
| 12 (dodecyl) | 145–160 | 92 |

EXAMPLE 2

*Preparation of Tertiary Amines*

*Method A.*—One mole of secondary amine was added dropwise at 75–80° C. to one mole of alkylphenylglycidyl ether as prepared in Example 1. The reaction was generally exothermic, however additional heating and higher temperatures were needed in some cases to increase the yield of tertiary amine. In the case of dimethylamine, a 40% aqueous solution was used at 45–50° C. Pertinent data concerning nine such reactions is given in the following table:

Table 2

ALKYLATED PHENOXY PROPANOL AMINES

| Alkyl Carbons in Alkylated Phenyl Group | Secondary Amine | Reaction Temp., °C. | Time, hours | Tertiary Amine (Yield), percent |
| --- | --- | --- | --- | --- |
| 9 | N-methyl aniline | 150 | 2 | 88 |
| 9 | Dibutyl amine | 150 | 2 | 96 |
| 9 | Piperidine | 75–100 | 2 | 97.8 |
| 9 | Morpholine | 120 | 2 | 96.5 |
| 9 | Diethyl amine | 75–80 | 16 | 95 |
| 9 | N-methyl benzyl amine | 110 | 2 | 92.8 |
| 9 | Dimethylamine | 45–50 | 16 | 84 |
| 8 | Diethyl amine | 90 | 16 | 98 |
| 12 | do | 90 | 16 | 90 |

*Method B.*—88 gms. of nonyl phenol is reacted with 51.6 gms. (a molar equivalent of 1-diethyl amino propylene-2,3-epoxide) by mixing the two liquids at room temperature and heating the mixture to about 75° C. At this point there is a slight exothermic reaction, and thereafter the temperature is increased to about 140–145° C. and held for about 6 hours. The γ-nonyl-phenoxy-β-hydroxy N,N-diethyl propylamine thus obtained after distillation is identical with the corresponding product as reported in Table 2 (item 5).

EXAMPLE 3

*Preparation of Polyethoxylated Tertiary Amines (Formula I)*

One hundred parts of tertiary amine as prepared in Example 2 and 0.5–1.0 parts solid sodium hydroxide were charged to a reaction flask equipped with a high speed stirrer and submerged gas addition tube. The reaction flask was immersed in an oil bath maintained at 160° C. Sufficient ethylene oxide (measured by weight increase) was introduced so as to provide the molar amount of ethylene oxide specified in Table 3. All the ethoxylated compounds were water soluble and surface active. Salts of the ethoxylated amines are prepared by merely reacting the amine with a molar equivalent of a mineral acid or a suitable organic acid such as acetic acid or hydroxyacetic acid.

Table 3

POLYETHOXYLATED TERTIARY AMINES

| Alkyl Carbons in Alkylated Phenyl Group | Secondary Amine | Moles EtO |
| --- | --- | --- |
| 9 | N-methyl aniline | 22 |
| 9 | Dibutyl amine | 22 |
| 9 | Piperidine | 20 |
| 9 | Morpholine | 16 |
| 9 | Diethyl amine | 22 |
| 9 | do | 50 |
| 9 | N-methyl benzyl amine | 22 |
| 9 | Dimethylamine | 20 |
| 8 | Diethyl amine | 35 |
| 12 | do | 19 |

EXAMPLE 4

*Preparation of Quaternary Ammonium Compounds*

To one mole of polyethoxylated tertiary amine prepared as described in Example 3 was added one mole of dimethyl sulfate (or methyl iodide) with stirring at 50°–60° C. The reaction was exothermic. The product was heated with stirring for 3–4 hours at 50–60° C. At the end of this time, there was no unquaternized amine in the final product (as determined by a non-aqueous titration in acetic acid, for amine, by perchloric acid). Pertinent data concerning several such quaternizing reactions are given in the following table. Aqueous solutions of these compounds were clear and surface active.

*Table 4*

| Tertiary Amine | Quaternizing Agent | Moles Eto |
|---|---|---|
| 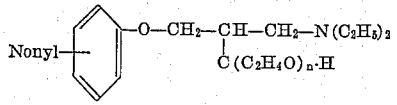 | (CH₃)₂SO₄ | 20 |
| 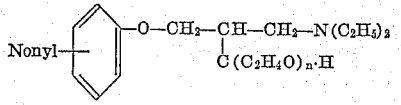 | (CH₃)₂SO₄ | 50 |
| 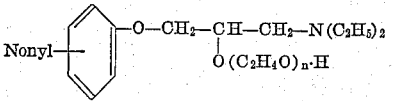 | CH₃I | 11 |
| 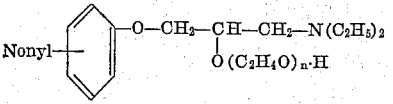 | CH₃I | 22 |
| 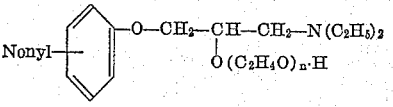 | CH₃I | 50 |

Various changes and modifications in the compositions and methods disclosed herein will occur to those skilled in the art, and to the extent that such changes and modifications are embraced by the appended claims, it is understood that they constitute part of our invention.

We claim:

1. A surface active substance selected from the group consisting of (1) the tertiary amines of the structural formula

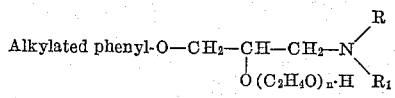

wherein the alkylated phenyl group contains 1 to 4 alkyl substituents providing a total of 6 to 18 carbon atoms, —NRR₁ is a secondary amino radical free of active hydrogen substituents, and $n$ is an integer from 1 to 100, (2) salts of said amines with acids, and (3) quaternary ammonium derivatives of said amines.

2. A surface active product as defined in claim 1 wherein the radical —NRR₁ is selected from the group consisting of N,N-lower dialkylamino, N-lower alkyl N-phenyl amino, N-lower alkyl N-benzyl amino, N,N-dibenzyl amino, piperidyl, morpholyl and pyrrolidyl radicals.

3. A surface active amine of the formula

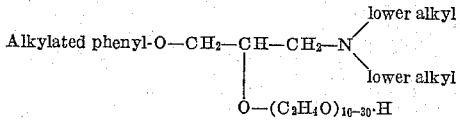

wherein the alkylated phenyl group contains 1 to 4 alkyl substituents providing a total of 6 to 18 carbon atoms.

4. A salt of an acid with a surface active amine as defined in claim 3.

5. A quaternary ammonium derivative of a surface active amine as defined in claim 3.

6.

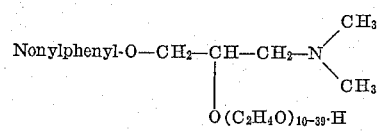

7.

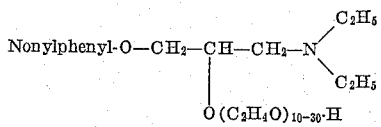

8.

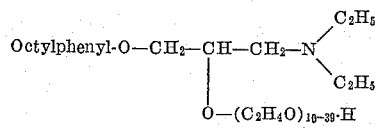

9.

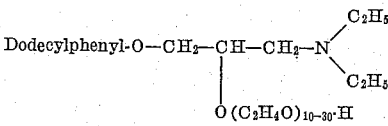

References Cited in the file of this patent

UNITED STATES PATENTS

| 2,229,024 | Bruson | June 21, 1941 |
| 2,547,965 | Olin | Apr. 10, 1941 |
| 2,554,441 | Cross et al. | May 22, 1951 |
| 2,944,902 | Carroll et al. | July 12, 1960 |

OTHER REFERENCES

Wagner et al.: "Synthetic Organic Chemistry," John Wiley & Sons Inc., London, pp. 233 (1953). (Copy in Pat. Off. Sci. Library.)